United States Patent
Prasad et al.

(10) Patent No.: US 11,874,812 B2
(45) Date of Patent: Jan. 16, 2024

(54) OPTIMIZING PERFORMANCE USING A METADATA INDEX SUBTABLE FOR COLUMNAR STORAGE

(71) Applicant: Teradata US, Inc., San Diego, CA (US)

(72) Inventors: Snigdha Prasad, Hyderabad (IN); Dinesh Chengalpatu, Hyderabad (IN); Arnab Roy, Hyderabad (IN); Sama Rajender Reddy, Hyderabad (IN); Karthik Sai Vakkalagadda, Vizag (IN); Venkata Sai Prakash Reddy Sangu, Guntur (IN)

(73) Assignee: Teradata US, Inc., San Diego, CA (US)

( * ) Notice: Subject to any disclaimer, the term of this patent is extended or adjusted under 35 U.S.C. 154(b) by 16 days.

(21) Appl. No.: 17/410,655

(22) Filed: Aug. 24, 2021

(65) Prior Publication Data

US 2022/0207011 A1    Jun. 30, 2022

Related U.S. Application Data

(60) Provisional application No. 63/132,599, filed on Dec. 31, 2020.

(51) Int. Cl.
*G06F 16/22* (2019.01)
*G06F 16/2455* (2019.01)
(Continued)

(52) U.S. Cl.
CPC ........ *G06F 16/221* (2019.01); *G06F 16/2282* (2019.01); *G06F 16/24554* (2019.01); *G06F 16/24573* (2019.01); *G06F 16/284* (2019.01)

(58) Field of Classification Search
CPC .............. G06F 16/221; G06F 16/2282; G06F 16/24554; G06F 16/24573; G06F 16/284; G06F 16/278; G06F 16/27; G06F 16/2228
See application file for complete search history.

(56) References Cited

U.S. PATENT DOCUMENTS

| | | | |
|---|---|---|---|
| 9,922,086 B1 * | 3/2018 | Huang | G06F 16/2379 |
| 10,359,962 B1 * | 7/2019 | Peterson | G06F 3/0679 |

(Continued)

OTHER PUBLICATIONS

Al-Kateb, Mohammed, et al. "Hybrid row-col. partitioning in teradata®." (2016) Proceedings of the VLDB Endowment 9.13: 1353-1364. (Year: 2016).*

(Continued)

*Primary Examiner* — Tamara T Kyle
*Assistant Examiner* — Lana Alagic
(74) *Attorney, Agent, or Firm* — Gates & Cooper LLP (57) ABSTRACT

A method, apparatus, and computer program product for executing a relational database management system (RDBMS) in a computer system, wherein the RDBMS manages a relational database comprised of at least one column-partitioned base table storing data. Column values from at least one column of the column-partitioned base table are stored in one or more containers spread across one or more data blocks. Metadata comprising summarized information about the column values in the containers is stored in a metadata index subtable. A query with a filtering condition on the column is applied to the metadata index subtable before the column-partitioned base table is accessed, so that only qualified containers and data blocks are accessed, and unqualified containers and data blocks are eliminated, when responding to the query.

15 Claims, 9 Drawing Sheets

MIS 500

| PID | RID | MINVAL | MAXVAL |
|---|---|---|---|
| PID 1 | RID 10 | *** | *** |
| PID 1 | RID 20 | *** | *** |
| PID 1 | RID 30 | *** | *** |
| PID 1 | RID 40 | *** | *** |
| PID 1 | RID 50 | 201 | 300 |
| PID 1 | RID 51 | 301 | 400 |
| PID 1 | *** | *** | *** |
| PID 2 | *** | *** | *** |
| PID 2 | *** | *** | *** |
| PID 3 | RID 500 | *** | *** |
| PID 3 | RID 501 | *** | *** |

(51) Int. Cl.
*G06F 16/2457* (2019.01)
*G06F 16/28* (2019.01)

(56) References Cited

U.S. PATENT DOCUMENTS

| | | | |
|---|---|---|---|
| 2009/0063396 A1* | 3/2009 | Gangarapu | G06F 16/2228 |
| 2015/0278327 A1* | 10/2015 | Raghavan | G06F 9/466 |
| | | | 707/615 |
| 2017/0116237 A1* | 4/2017 | Zhang | G06F 16/221 |
| 2017/0308572 A1* | 10/2017 | Finlay | G06F 16/2453 |
| 2019/0294714 A1* | 9/2019 | Guy Gerson-Golan | ................. |
| | | | G06F 16/24545 |
| 2020/0272638 A1* | 8/2020 | Motivala | G06F 16/221 |

OTHER PUBLICATIONS

Sun, Liwen, et al. "Skipping-oriented partitioning for columnar layouts." (2016) Proceedings of the VLDB Endowment 10.4: 421-432. (Year: 2016).*

* cited by examiner

MIS 500

| PID | RID | MINVAL | MAXVAL |
|---|---|---|---|
|  | RID 10 | *** | *** |
|  | RID 20 | *** | *** |
|  | RID 30 | *** | *** |
|  | RID 40 | *** | *** |
|  | RID 50 | 201 | 300 |
|  | RID 51 | 301 | 400 |
|  | *** | *** | *** |
|  | *** | *** | *** |
|  | *** | *** | *** |
|  | RID 500 | *** | *** |
|  | RID 501 | *** | *** |

MIS 500

| PID | RID | MINVAL | MAXVAL |
|---|---|---|---|
| PID 1 | RID 10 | *** | *** |
| PID 1 | RID 20 | *** | *** |
| PID 1 | RID 30 | *** | *** |
| PID 1 | RID 40 | *** | *** |
| PID 1 | RID 50 | 201 | 300 |
| PID 1 | RID 51 | 301 | 400 |
| PID 1 | *** | *** | *** |
| PID 2 | *** | *** | *** |
| PID 2 | *** | *** | *** |
| PID 3 | RID 500 | *** | *** |
| PID 3 | RID 501 | *** | *** |

OPTIMIZING PERFORMANCE USING A METADATA INDEX SUBTABLE FOR COLUMNAR STORAGE

CROSS REFERENCE TO RELATED APPLICATIONS

This application is related to the following and commonly-assigned application:

U.S. Provisional Patent Application Ser. No. 63/132,599, filed on Dec. 30, 2020, by Snigdha Prasad, Dinesh Chengalpatu, Arnab Roy, Rajender Sama, Karthik Vakkalagadda and Prakash Sangu, and entitled "OPTIMIZING CPU & IO USING METADATA INDEX SUBTABLE FOR COLUMNAR TABLES,";

which application is incorporated by reference herein.

BACKGROUND OF THE INVENTION

1. Field of the Invention

This invention relates to methods and techniques for physical database design and optimization in relational database management systems.

2. Description of Related Art

Computer systems implementing a relational database management system (RDBMS) are well known in the art. An RDBMS stores data as relational tables (also referred to as relations) comprised of rows and columns (also referred to as tuples and attributes, respectively), and uses a data manipulation language (DML), such as a structured query language (SQL), to create, update and access the data.

Database tables may be horizontally partitioned by row and/or vertically partitioned by column. Partitioning by row is especially useful for query processing that references a subset of rows, while partitioning by column is especially useful for query processing that references a subset of columns.

In Teradata® Vantage™ sold by Teradata US, Inc., the assignee of the present invention, both types of partitioning can be combined into "hybrid partitioning," wherein a base table is partitioned by column and then partitioned by row, using the partitioned column to define boundaries of the row partitioning. This creates smaller partitions, each of which represents an intersection of the column partition and row partition.

However, there remains a need in the art for improved methods of managing partitions for relational database management systems. The present invention satisfies this need.

SUMMARY OF THE INVENTION

A method, apparatus, and computer program product for executing a relational database management system (RDBMS) in a computer system, wherein the RDBMS manages a relational database comprised of at least one column-partitioned table storing data. Column values from at least one column of the column-partitioned table are stored in one or more containers spread across one or more data blocks. Metadata comprising summarized information about the column values in the containers is stored in a metadata index subtable. In one embodiment, the metadata is comprised of a partition identifier, row identifier, minimum column value, and maximum column value. A query with a filtering condition on the column is applied to the metadata index subtable before the column-partitioned table is accessed, so that only qualified containers and data blocks are accessed, and unqualified containers and data blocks are eliminated, when responding to the query. In one embodiment, the filtering condition is applied to the minimum column value and the maximum column value within the metadata index subtable, which identify the qualified and unqualified containers and data blocks. Moreover, the row identifier comprises a container identifier and, for each of the qualified containers identified, the row identifier from the metadata index subtable is used to access the qualified containers and data blocks.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized, and structural changes may be made without departing from the scope of the present invention.

Overview

The present invention provides a method and apparatus for improving the computer performance when accessing column values of a column partitioned (or columnar) table. Specifically, the present invention improves performance, in terms of CPU and I/O resources, when accessing the columnar table.

Hardware and Software Environment

Figure 1:
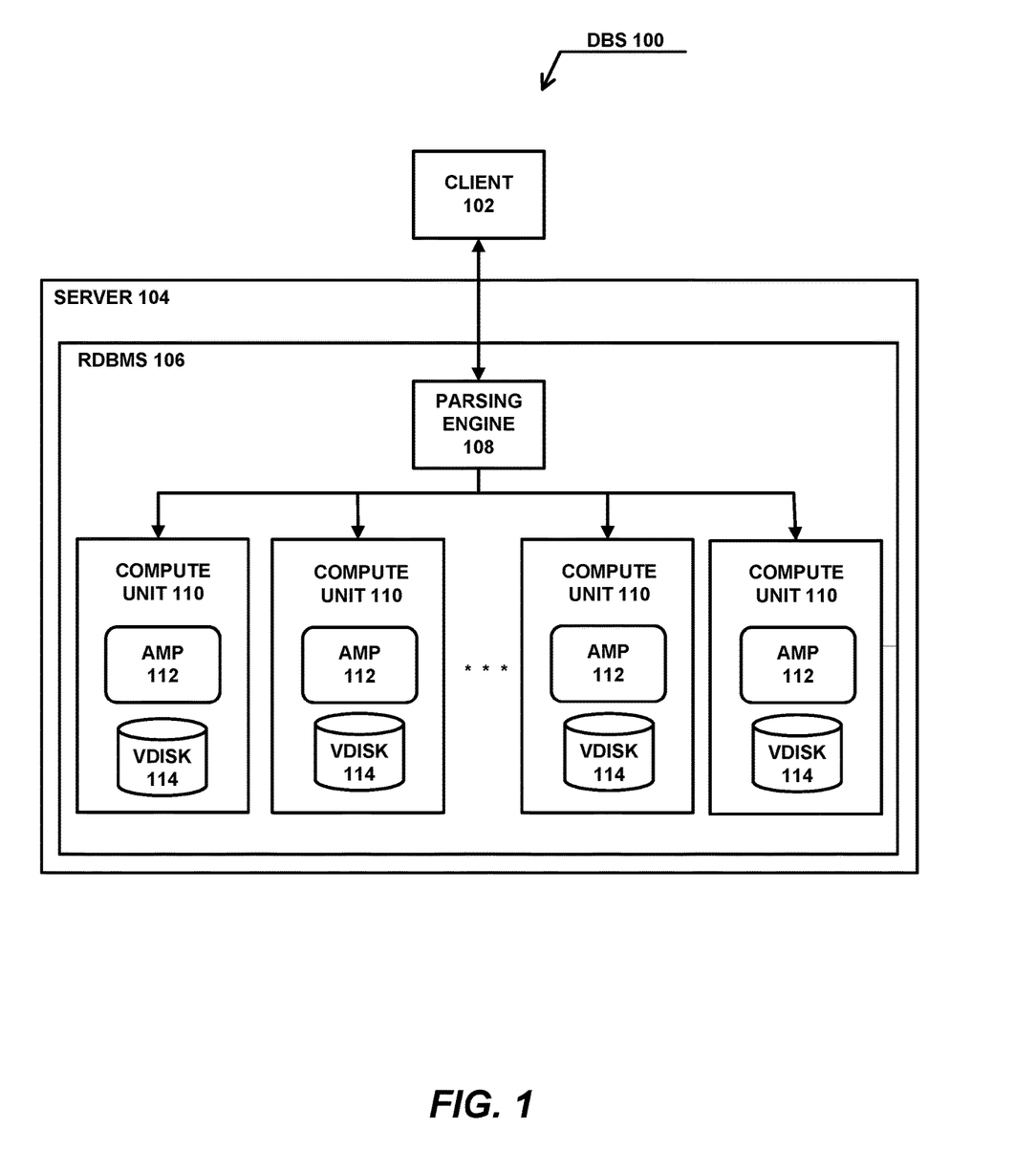
FIG. 1 illustrates an exemplary hardware and software environment according to one embodiment of the present invention.

FIG. 1 illustrates an exemplary hardware and software environment according to one embodiment of the present invention. In the exemplary environment, a database system (DBS) 100 is a computer system that implements a client-server architecture, wherein one or more client computers 102 may include, inter alia, a graphical user interface (GUI), which allows one or more users to interface with one or more server computers 104, which implement an RDBMS 106 that stores data and metadata in a relational database comprised of one or more tables and/or subtables storing the data and metadata. The DBS 100 may be implemented in separate machines, or may be implemented as separate or related processes in a single machine.

In one embodiment, the RDBMS 106 includes a parsing engine (PE) 108 that organizes storage of the data and coordinates retrieval of the data from the storage, one or more compute units 110 executing one or more access module processors (AMPs) 112 performing the functions of the RDBMS 106, and one or more virtual disks (VDISKs) 114 storing the relational database of the RDBMS 106. The compute units 110 comprise processors, and the AMPS 112 and VDISKs 114 comprise processes that may be implemented in one or more separate machines or in a single machine.

The RDBMS 106 used in one embodiment comprises the Teradata® RDBMS sold by Teradata US, Inc., the assignee of the present invention, although other DBMS's could be used. In this regard, the Teradata® RDBMS is a hardware and software based data warehousing and analytic application/database system.

Generally, users of the system 100 interact with the client computers 102 to formulate requests for the RDBMS 106 executed by the server computers 104, wherein the requests access data stored in the RDBMS 106, and responses are received therefrom. In response to the requests, the RDBMS 106 performs the functions described below, including processing data retrieved from the RDBMS 106. Moreover, the results from these functions may be provided directly to the client computers 102, or may be provided to other computer systems (not shown), or may be stored by the RDBMS 106 in the relational database.

Note that, in one or more embodiments, the system 100 may use any number of different parallelism mechanisms to take advantage of the parallelism offered by the multiple tier architecture, the client-server structure of the client computers 102, server computers 104, RDBMS 106, PE 108, and the multiple compute units 110, AMPs 112 and VDISKs 114 of the RDBMS 106. Further, data within the relational database may be partitioned across multiple data storage devices to provide additional parallelism.

Generally, the client computers 102, server computers 104, RDBMS 106, PE 108, compute units 110, AMPs 112 and VDISKs 114 comprise hardware, such as computers, processors, data storage devices and networks, and software, such as instructions, logic and/or data tangibly embodied in and/or accessible from a device, media, or carrier, such as RAM, ROM, one or more of the data storage devices, and/or a remote system or device communicating with the DBS 100 via one or more of the networks, thereby making a computer program product or article of manufacture according to the invention. As such, the terms "article of manufacture," "program storage device" and "computer program product" as used herein are intended to encompass program instructions accessible from any computer readable storage medium. Accordingly, such articles of manufacture are readable by a computer system and the program instructions are executable by the computer system to cause the computer system to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Parsing Engine

Figure 2:
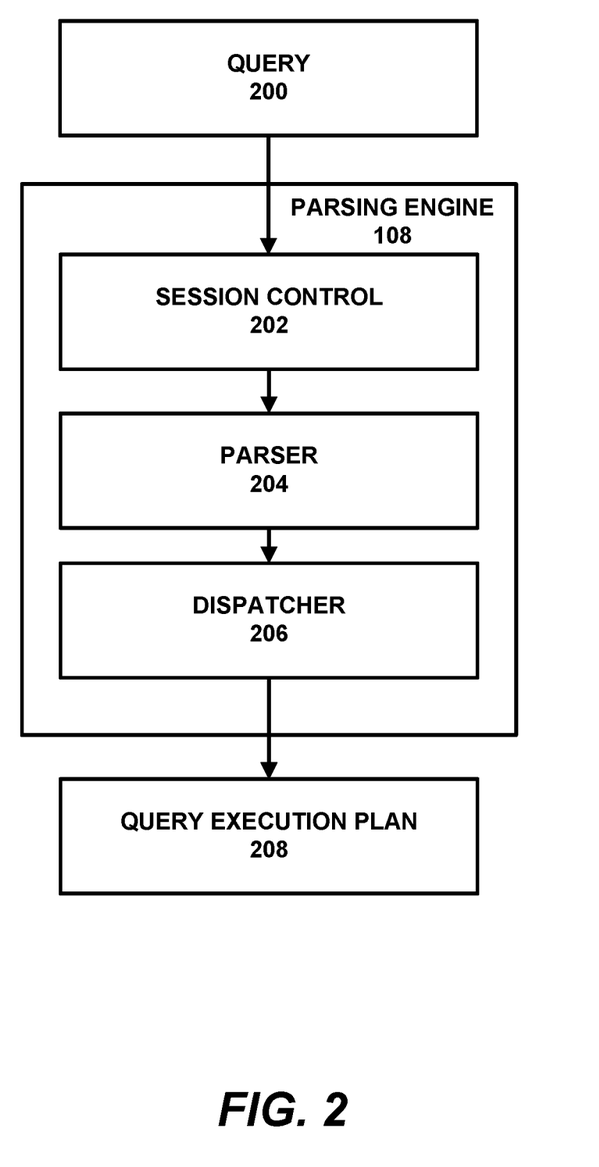
FIG. 2 illustrates an exemplary set of functions performed by a parsing engine when coordinating the retrieval of data in response to a query.

FIG. 2 further illustrates an exemplary set of functions performed by the PE 108 when coordinating the retrieval of data in response to a query 200. In one example, the PE 108 performs at least three functions: a session control 202, a parser 204, and a dispatcher 206. The session control 202 provides logon and logoff functions, and processes requests for access to the database. Once the session control 202 allows a request for access to the database to begin, the query 200 is routed to the parser 204, which interprets the query 200, and then to the dispatcher 206, which schedules and executes one or more resulting query execution plans 208 generated by the parser 204 using the AMPs 112 and VDISKs 114.

Figure 3:
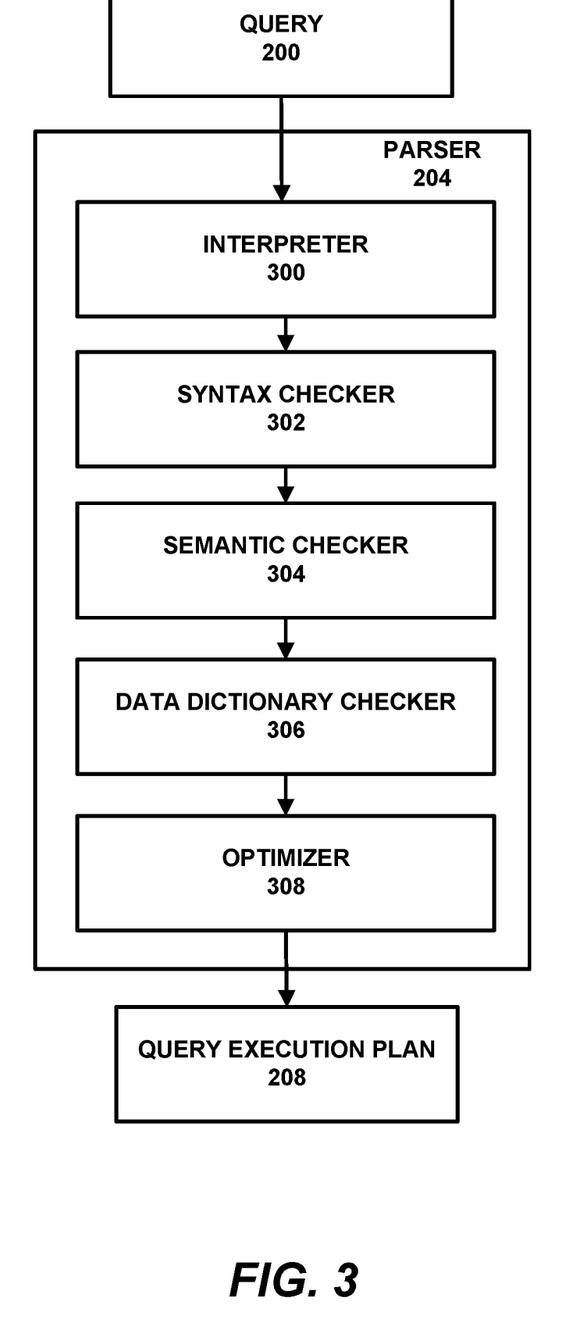
FIG. 3 illustrates an exemplary set of functions performed by a parser when interpreting a query.

FIG. 3 further illustrates an exemplary set of functions performed by the parser 204 when interpreting the query 200. An interpreter 300 interprets the query 200, a syntax checker 302 checks the query 200 for proper syntax, a semantic checker 304 evaluates the query 200 semantically, and a data dictionary checker 306 consults a data dictionary to ensure that all the data objects specified in the query 200 actually exist and that the user has the authority to access the data objects. Finally, an optimizer 308 generates one or more query execution plans 208 for the query 200 and selects an optimal query execution plan 208 (e.g., the least expensive plan) for the query 200, which is performed by the AMPs 112 and VDISKs 114.

Column Partitioning

In the RDBMS 106, the column values of a column-partitioned (or columnar) base table are stored in one or more containers spread across one or more data blocks. A data block is a disk-resident file system structure that contains one or more physical rows from the base table. Data blocks have a header identifying the rows in the data block, namely the first row identifier and the last row identifier, the base table, and information about the space available in the block. Physical rows are wholly contained within a single data block and are not split between multiple data blocks.

When an end user issues a query 200 that filters these column values based upon a predicate, all the containers for the column spread across the data blocks are read and one or more qualified column values are returned. There is a possibility that some (if not all) data blocks or containers that are read include column values that do not qualify based upon the predicate.

In order to achieve the best performance, in terms of CPU and I/O resources, when accessing column-partitioned base tables, summarized information or metadata about the column values in the containers will help optimally retrieve data from the containers and base tables. This metadata could help identify qualified and/or unqualified data blocks and containers, so that only qualified data blocks and containers are read, and unqualified data blocks and containers are not read, thus saving CPU and I/O resources. The challenge is how to store this metadata so that it can be used in a most optimal way.

Some possible solutions for storing this metadata include the following:

1. Within the container: Storing the metadata within the container improves the use of CPU resources, but does not reduce the use of I/O resources. The metadata can be stored at a beginning or end of the container. However, accessing the metadata would require accessing the data block that stores the container.

2. Within a micro-partition or row-group: In some column-based databases or storage formats, metadata is maintained at a micro-partition (e.g., Snowflake™) or row-group (e.g., parquet file format) level. This helps eliminate the entire micro-partition or row-group based when filtering. Apart from this, container level metadata is also maintained for each column container within these micro-partitions or row-group.

3. Within a cylinder index (CI): A cylinder index is a disk-resident file system file structure that contains substructures referred to as Subtable Reference Descriptors (SRDs) and Data Block Descriptors (DBDs), wherein each disk cylinder has its own cylinder index. The cylinder index contains pointers to all the data blocks and free sectors on the disk cylinder it represents. The SRD contains a table identifier for the base table stored in a data block and the DBD stores the location of the data block as well as a range of partition identifiers and row identifiers allocated on that block. Storing the metadata within the cylinder index could help in reducing the use of I/O resources by eliminating unqualified data blocks. However, the following issues were considered when storing the metadata in the cylinder index, including the associated limitations:

3.1. Within the DBD: Storing the metadata within the DBD is problematic due to a lack of available space within the DBD. Currently, only 8 bytes is free (reserved for some future use) and this likely would not be enough to store the metadata for a column container. If the size of the DBD was further increased, it could affect the available storage space for the actual data blocks.

3.2. Within a new data structure in the CI: Storing the metadata as a new metadata DBD or within a new data structure in the CI results in two issues. The first issue is that there would be a reduction in available space within the CI for storing SRDs and DBDs. The second issue is that, during data block migration and/or alteration, which is very common, the metadata would also need to be migrated and/or altered, which is an additional maintenance overhead.

4. Within a separate Metadata Index Subtable (MIS): Storing the metadata as a new MIS would reduce the use of CPU and I/O resources. In this approach, the MIS is a separate subtable maintained for a column-partitioned base table, wherein the MIS is used to store the metadata for each column partition. For queries with filtering conditions on the column, the MIS is read before the base table is read. Based on the metadata stored in the MIS, only qualified container(s) and their associated data block(s) would need to be read, which reduces the use of I/O resources significantly. Another level of filtering is that not all containers need to be read (due to the pre-fetch of the container level metadata) and decompressed, thereby reducing use of CPU resources greatly.

In view of the above, the present invention stores this metadata in the MIS.

MIS Implementation

In one embodiment, the RDBMS 106 uses the MIS to store metadata information for the data block and container, which may include, but is not limited to, partition identifier, row identifier (which is also a container identifier), minimum column value, and maximum column value. The MIS may include other information as well, such as number of nulls, row count, sum/avg aggregations, a bloom filter for indicating whether a column value is present in a container or data block, etc. Each row of the MIS maps to each column container in the base table. The row identifier (which is also a container identifier) of the base table is replicated as the row identifier of the MIS.

Whenever the query 200 includes a filtering condition on the column of the base table, the MIS is used to identify qualified containers and data blocks, and/or eliminate unqualified containers and data block. The condition is first applied on the minimum and maximum column values within the MIS, which identifies the qualified containers by the row identifier. For each qualified container, the row identifier from the MIS is used to access the qualified container. In this way, unqualified containers are need not be accessed. As a result, CPU resources are saved by eliminating the decompression of the unqualified containers. Further, eliminating unqualified containers could lead to eliminating data blocks that do not have any qualified containers, which reduces the use of I/O resources as well. As a result, this approach improves the use of both CPU as well as I/O resources, as it accesses a column from a column-partitioned base table using the least possible CPU and I/O resources.

Making the row identifier of the MIS the same as the container identifier of the base table is also beneficial when the base table is both column-partitioned as well as row-partitioned, and a filtering condition is applied to one or more partitions using static partition elimination (SPE). If a partitioning expression comprises constant equality constraints, static partition elimination eliminates all but qualified partitions, thus significantly reducing the number of data blocks that are accessed for the filtering condition.

When queries 200 with min/max aggregation on a column are performed and the column has an MIS available, the operation may be eligible for an "MIS only" operation where the containers and data blocks may not need to be accessed; instead, only the MIS is accessed for the minimum and maximum column values.

Note that, in an alternative embodiment, the metadata information could also be stored in a Metadata Information Partition (MIP) for the base table, wherein the MIP is structured like the MIS. The benefits of eliminating containers or data blocks, or using "MIS only access," would still be valid.

First Example

In a first example, the use of CPU and I/O resources is reduced due to data block and container elimination.

Consider, first, the following DML statements for creating a Line-Item base table with columns Line-Item-No and Date-Col, wherein the base table is column-partitioned:

```
CREATE TABLE Line-Item
(Line-Item-No int, Date-Col int)
NO PRIMARY INDEX
PARTITION BY COLUMN;
```

In this example, the PARTITION BY COLUMN option specifies column partitioning for both Line-Item-No and Date-Col columns.

Consider, next, the following SQL statements for a query 200 accessing the base table:

```
SELECT Line-Item-No
FROM Line-Item
WHERE Line-Item-No > 250 and Line-Item-No < 400;
```

Figure 4:
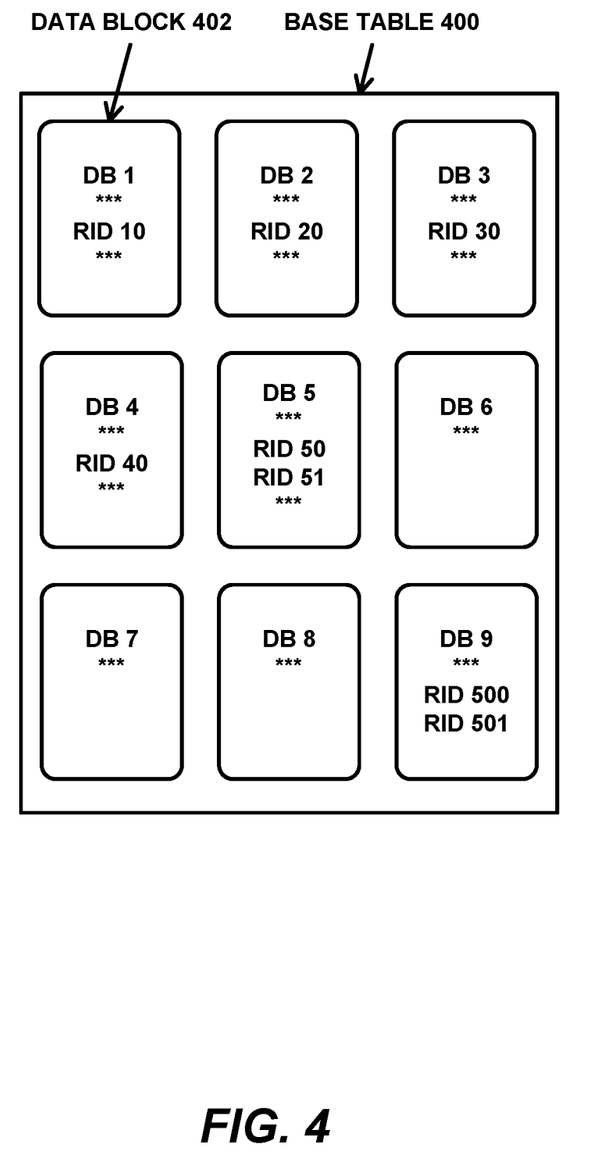
FIG. 4 is a schematic showing the physical layout of a table in a first example, which includes a plurality of data blocks.

FIG. 4 is a schematic showing the physical layout of the Line-Item base table 400 in the first example, which includes a plurality of data blocks 402. In the data blocks 402, DB x is a data block number, wherein x=1, 2, . . . , 9; and RID y is a row identifier, wherein y=10, 20, 30, 40, 50, 51, . . . , 500, 501.

In this example, all the data blocks 402 shown are for column partitioning on the Line-Item-No column. For simplicity, assume sorted rows in the data blocks 402.

Figure 5:
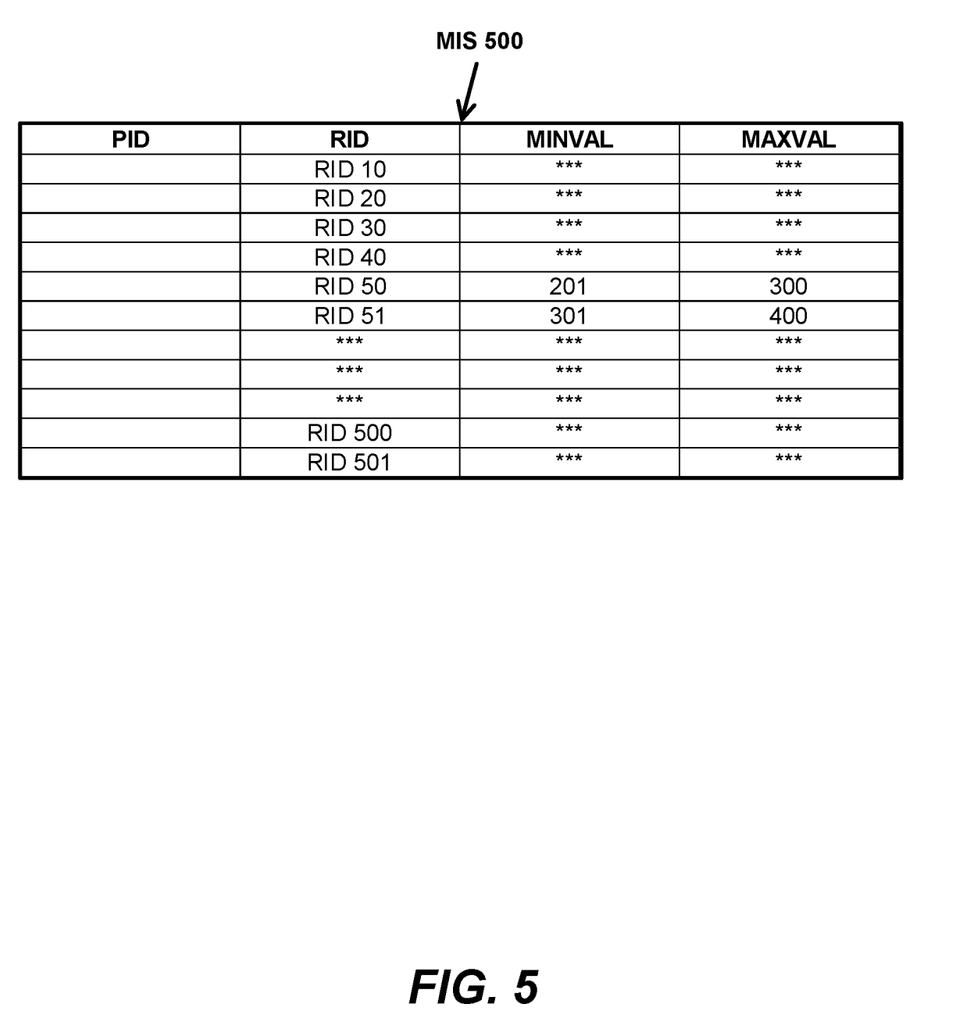
FIG. 5 is a schematic showing the physical layout of a metadata index subtable for the table of FIG. 4 in the first example.

FIG. 5 is a schematic showing the physical layout of the MIS 500 for the Line-Item base table 400 in the first example, wherein the MIS 500 includes at least a PID (partition identifier), RID (row identifier and container identifier), MINVAL (minimum column value) and MAXVAL (maximum column value) for the Line-Item-No column of the Line-Item base table 400. In other embodiments, the MIS 500 may include other metadata information as well.

Query Rewrite for the MIS

The following describes a query 200 rewrite that is performed using the MIS 500 in the first example:

```
SELECT RID
FROM MIS
WHERE MINVAL < 400 and MAXVAL > 250;
```

The table below is a comparison of the behavior using the base table as compared to using the MIS 500 in the first example:

| Base Table Behavior | MIS Behavior |
|---|---|
| Read all nine data blocks 402 labeled from DB 1 to DB 9. | Read only the data block labeled DB 5 and containers with RID 50 and 51. |
| Filtering condition "Line-Item-No > 250 and Line-Item-No < 400" applied on every container. | Filtering condition only applied on the two containers with RID 50 and 51. |
| I/O of 9 data blocks 402. | I/O of only 1 data block 402. |
| CPU for decompressing every container in the 9 data blocks 402. | CPU for decompressing only 2 containers labeled with RID 50 and 51. |

Second Example

In a second example, static partition elimination is performed in the MIS 500 with further reductions in the use of CPU and I/O resources.

Consider, first, the following DML statements for creating a Line-Item base table 400 with columns Line-Item-No and Date-Col, wherein the base table 400 is both column-partitioned and row-partitioned:

```
CREATE TABLE Line-Item
(Line-Item-No int, Date-Col int)
NO PRIMARY INDEX
PARTITION BY (
COLUMN ADD 10,
RANGE_N(Date-Col BETWEEN DATE '1992-01-01' AND DATE
'1992-12-31' EACH INTERVAL '1' MONTH ) );
```

In this example, the COLUMN ADD 10 option specifies a column partitioning level with a maximum of 10 partitions defined for the level. The RANGE_N function is the partitioning expression, using the Date-Col values between a specified range of '1992-01-01' and '1992-12-31' with each interval of 1 month.

Figure 6:
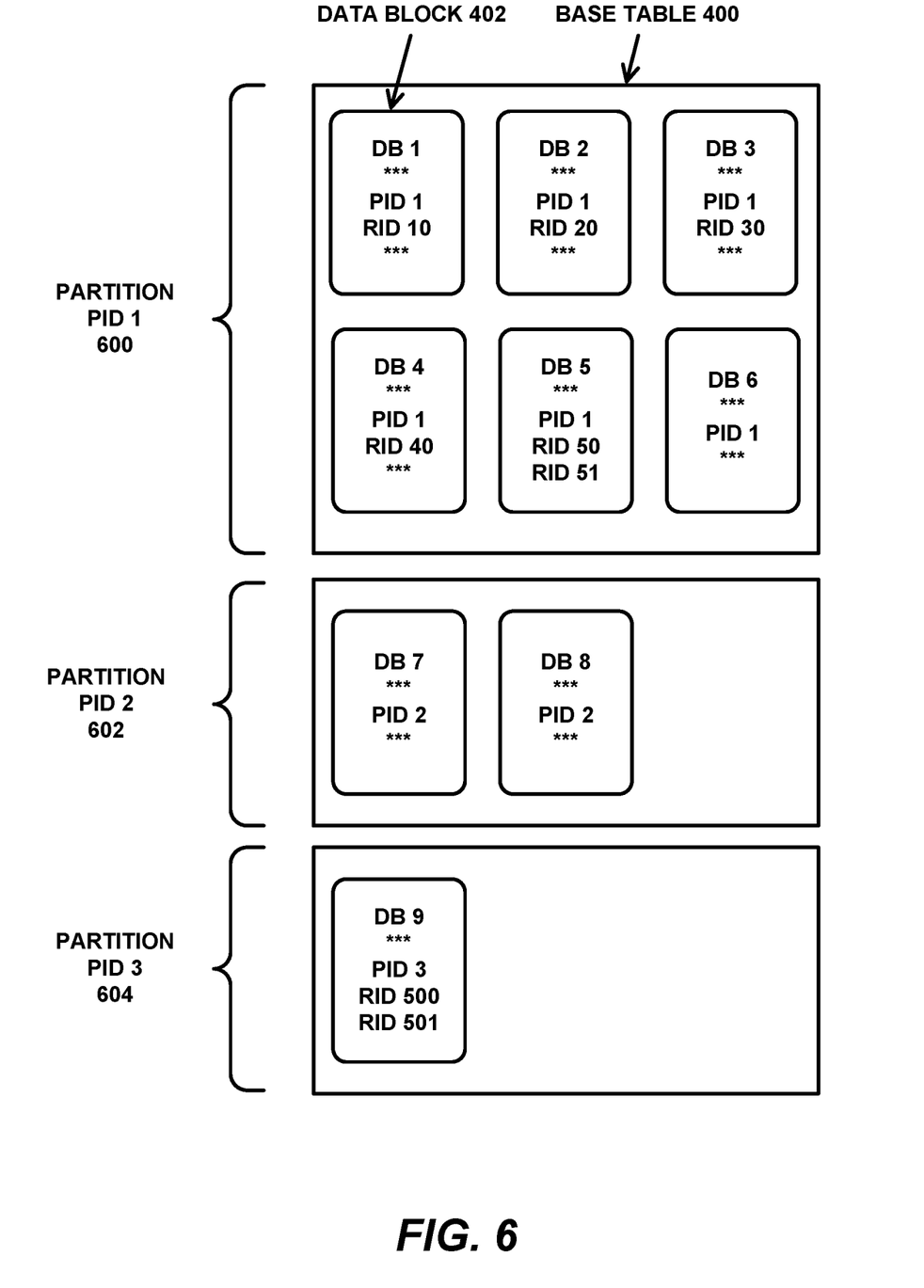
FIG. 6 illustrates the resulting partitions for the table of FIG. 4 in a second example.
Figure 7:
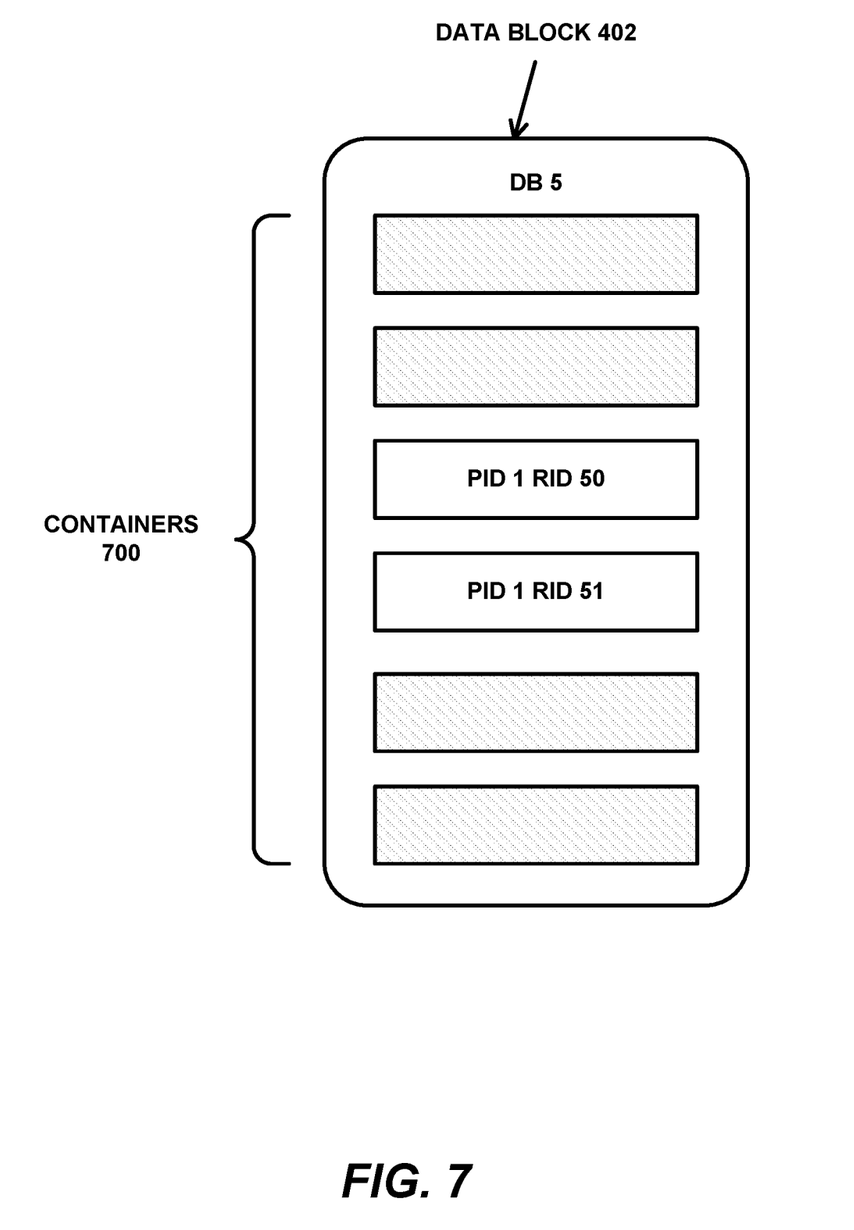
FIG. 7 illustrates the resulting containers in a data block of the table of FIG. 4 in the second example.

FIG. 6 illustrates the resulting partitions, labeled as PID 1 600, PID 2 602, PID 3 604, and FIG. 7 illustrates the resulting containers 700 in the one of the data blocks 402.

Consider, next, the following SQL statements for a query 200 accessing the base table:

```
SELECT Line-Item-No
FROM Line-Item
WHERE
Extract(month from Date-Col) in (1,3) and
Line-Item-No > 250 and Line-Item-No < 400;
```

Without the MIS 500, due to a filtering condition on the row-partitioned column Date-Col, static partition elimination reads only partitions P1 600 and P3 604.

Figure 8:
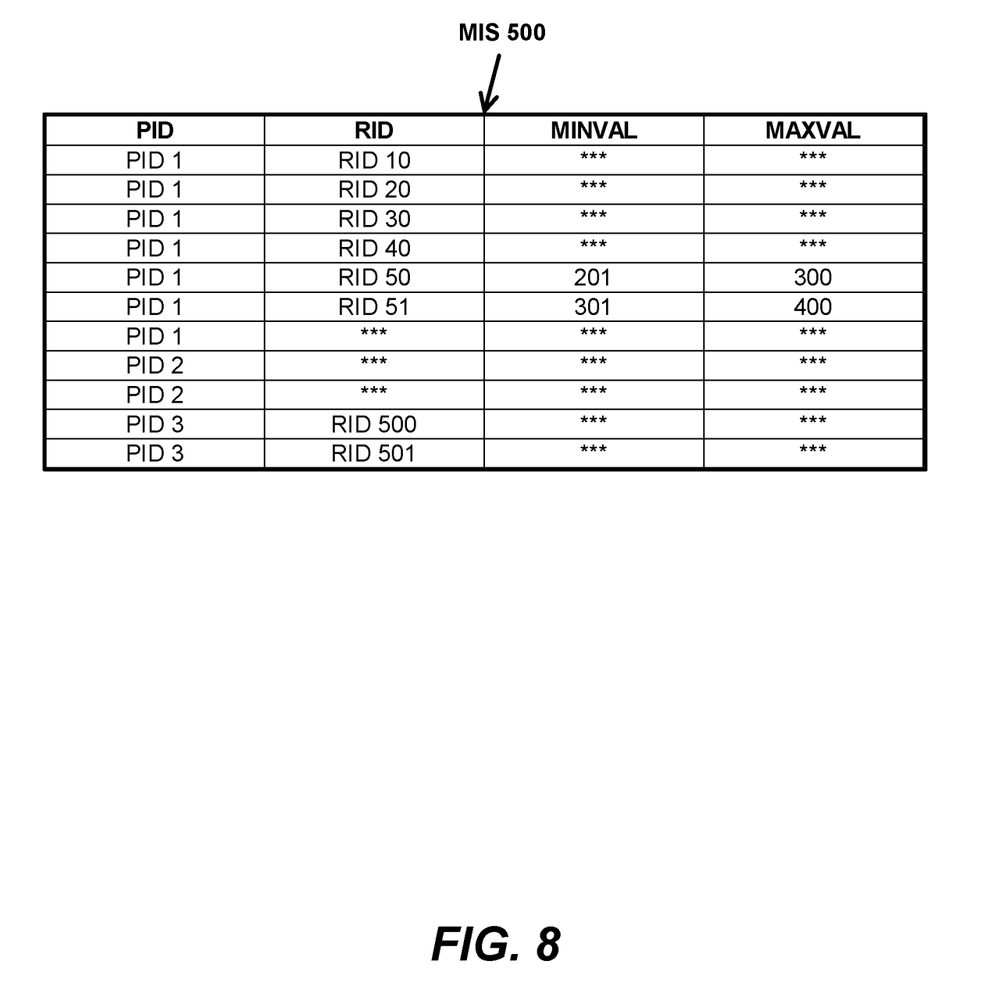
FIG. 8 is a schematic showing the physical layout of the metadata index subtable for the table of FIG. 4 in the second example.

FIG. 8 is a schematic showing the physical layout of the MIS 500 for the Line-Item base table 400 in the second example.

With static partition elimination, only rows for partitions PID 1 600 and PID 3 604 are read from the MIS 500. Within partition PID 1 600, only the containers 700 with RIDs 50 and 51 are read. If none of the Line-Item-No containers within partition PID 3 604 satisfy the filtering condition "Line-Item-No>250 and Line-Item-No<400", then partition PID 3 604 may be eliminated and not read at all.

Behavior Comparison

Consider a comparison between an approach using the base table 400 with static partition elimination, and an approach using the base table 400 with the MIS 500. In the approach using the base table 400 with static partition elimination, all blocks from partitions PID 1 600 and PID 3 604 of the base table 400 are read for applying conditions, if any. In the approach using the base table 400 with the MIS 500, reads can be driven via the RIDs of the MIS 500, which is the same as the RIDs of the containers 700 of the base table 400. There is a benefit in reducing the use of I/O resources by reading only 1 of 8 data blocks 402 from the partition PID 1 600. There is also a benefit in reducing the use of CPU resources by not needing to de-compress 10 of 12 containers and using EVAL (expression evaluator) conditions.

Creation of the MIS

A CREATE INDEX statement is easily extended to support creation of the MIS 500. Moreover, the MIS 500 may be created based on a workload basis, wherein a workload comprises at least one query 200 and/or at least one query execution plan 208 for the query 200. The workload would first be run with an EXPLAIN keyword to provide information about how the RDBMS 106 executes the query 200, to collect the query execution plans 208, and to generate the MIS 500 recommendations. Based upon the recommendations, an MIS 500 is then created for each base table 400. Note that each base table 400 can have one or more than one MIS 500 based upon the how the query 200 and/or query execution plan 208 access the base table 400.

Identifying Columns for Creation of the MIS:

1. Based on column data type:

The MIS 500 can, by default, be created on all numeric and small-sized fixed character (CHAR) columns of the base table 400. This is because such data types involve the least space and comparison overheads.

2. Based upon query type:

For a MIN/MAX aggregate query 200 without any GROUP BY clauses, the underlying columns can result in the creation of the MIS 500, and the query 200 can be performed using only the MIS 500, without accessing the base table 400.

3. Based on query predicate:

The MIS 500 can be created for columns involved in filtering conditions for the base table 400. This could be restricted for conditions that are the basis for a column partitioning scan that have a selectivity less than a stipulated threshold. This restriction could be applied when running a workload with an EXPLAIN keyword.

MIS Maintenance

Maintenance of the MIS 500 involves overhead in the same manner as index maintenance. This is required for any INSERT and DELETE operation on the base table 400 and any UPDATE on an index column. The MIS 500 is updated only if a value being inserted, deleted or updated is a MINVAL and/or MAXVAL for a container. Additional overhead, as compared to index maintenance, is incurred in re-computing a new MINVAL and/or MAXVAL for the container.

Advantages and Benefits:

The following factors contribute to improved query performance using the present invention:

- Reduced use of CPU and I/O resources due to elimination of unqualified data blocks when applying a filtering condition for a column-partitioned base table.
- Further reduction in the use of CPU resources as only qualified containers within a data block are decompressed and read.
- Static partition elimination on the MIS that further optimizes reads from the MIS.
- A single store for triggering elimination at data block and container levels. To achieve a similar performance using different approaches, there would be metadata required at a data block level as well as a container level. Storing metadata at a single location in the MIS reduces the maintenance cost.
- As the metadata is placed in a separate subtable, there is no limitation on the type or size of data in the column for which metadata is to be stored.
- As the metadata is placed in a separate subtable, there is no limitation on the amount of metadata to be stored. Apart from minimum and maximum column values in the container, different information, such as the number of nulls, row count, sum/avg, container level bloom filter, etc., can be stored in the MIS.
- As subtables are fallback protected, there is no requirement for separate metadata for fallback data blocks.
- Easily fits into the existing scheme of things and does not need any storage level changes.
- Metadata can be stored for multi-column partitions.
- Flexibility in use as the MIS can be created and dropped whenever required.
- As the MIS stores data block and container level information, the size of the MIS is small, and hence I/O overhead is low.
- TPCH Benchmarks show as much as a 60% I/O improvement (best case) and 50% CPU improvement (best case).

Flowchart

Figure 9:
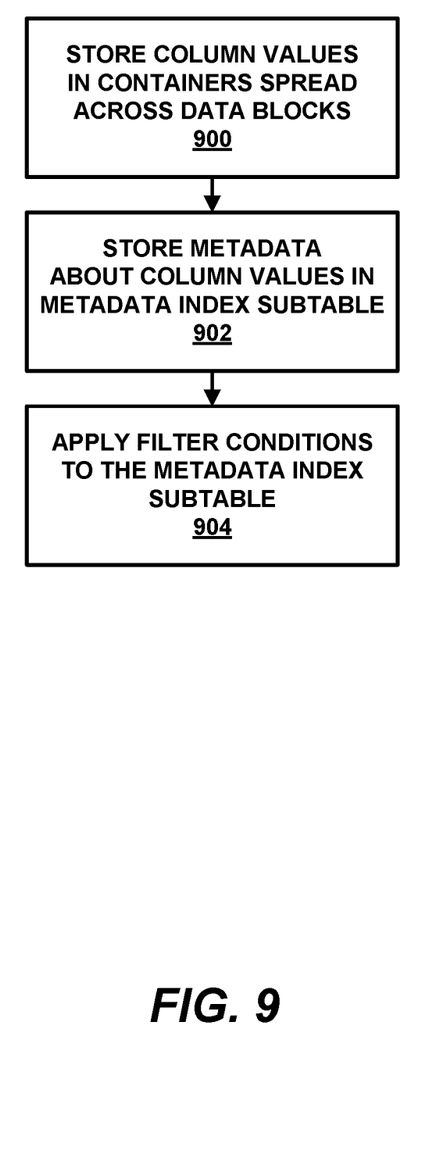
FIG. 9 is a flowchart that illustrates the steps performed in the present invention, when executing an RDBMS in a computer system, wherein the RDBMS manages a relational database comprised of at least one column-partitioned table storing data.

FIG. 9 is a flowchart that illustrates the steps performed in the present invention, when executing an RDBMS in a computer system, wherein the RDBMS manages a relational database comprised of at least one column-partitioned base table storing data.

Block 900 represents the step of storing column values from at least one column of the column-partitioned base table in one or more containers spread across one or more data blocks.

Block 902 represents the step of storing metadata comprising summarized information about the column values in the containers, in a metadata index subtable. In one embodiment, the metadata is comprised of a partition identifier, row identifier, minimum column value, and maximum column value. Moreover, the metadata index subtable may be stored separate from the column-partitioned base table.

Block 904 represents the step of performing a query with a filtering condition on the column, wherein the filtering condition is applied to the metadata index subtable before the column-partitioned base table is accessed, so that only qualified containers and data blocks are accessed, and unqualified containers and data blocks are eliminated, when responding to the query.

In one embodiment, the filtering condition is applied to the minimum column value and the maximum column value within the metadata index subtable, which identify the qualified and unqualified containers and data blocks. Moreover, the row identifier comprises a container identifier and, for each of the qualified containers identified, the row identifier from the metadata index subtable is used to access the qualified containers and data blocks; the unqualified containers and data blocks need not be accessed.

In another embodiment, static partition elimination eliminates all but qualified partitions when a partitioning expression for the column comprises constant equality constraints, thereby significantly reducing the containers and data blocks that are accessed for the filtering condition.

In another embodiment, only the metadata index subtable, and not the column-partitioned base table, is accessed when responding to the query. Further, the query is rewritten to access the metadata index subtable.

In yet other embodiments, the metadata index subtable is created on a workload basis, the metadata index subtable is created based on the column's data type, the metadata index subtable is created based on the query's type, and/or the metadata index subtable is created based on the query's predicate.

The metadata index subtable is updated only if a column value being inserted, deleted or updated in the column-partitioned base table is a minimum column value or a maximum column value for a container.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method, comprising:
   executing a relational database management system (RDBMS) in a computer system, wherein:
   the RDBMS manages a relational database comprised of at least one column-partitioned base table storing data;
   column values from at least one column of the column-partitioned base table are stored in one or more partitions comprised of one or more containers spread across one or more data blocks;

metadata comprising summarized information about the column values in the containers is stored in a metadata index subtable, wherein the metadata index subtable is comprised of metadata information for accessing the partitions, containers and data blocks, which includes a partition identifier for the column-partitioned base table, a row identifier for the metadata index subtable that is also a container identifier for the column-partitioned base table, a minimum column value, and a maximum column value; and a query with a filtering condition on a column of the column-partitioned base table is applied to the metadata index subtable before the column-partitioned base table is accessed, so that only qualified containers and data blocks are accessed, and unqualified containers and data blocks are eliminated, when responding to the query.

2. The method of claim 1, wherein the metadata index subtable is separate from the column-partitioned base table.

3. The method of claim 1, wherein the filtering condition is applied to the minimum column value and the maximum column value within the metadata index subtable, which identify the qualified containers and data blocks and the unqualified containers and data blocks.

4. The method of claim 3, wherein, for each of the qualified containers identified, the row identifier from the metadata index subtable is used to access the qualified containers and data blocks.

5. The method of claim 1, wherein the unqualified containers and data blocks are not accessed.

6. The method of claim 1, wherein static partition elimination (SPE) eliminates all but qualified partitions when a partitioning expression for the column comprises constant equality constraints, thereby reducing the containers and data blocks that are accessed for the filtering condition.

7. The method of claim 1, wherein only the metadata index subtable, and not the column-partitioned base table, is accessed when responding to the query.

8. The method of claim 1, wherein the query is rewritten to access the metadata index subtable.

9. The method of claim 1, wherein the metadata index subtable is created on a workload basis.

10. The method of claim 1, wherein the metadata index subtable is created based on the column's data type.

11. The method of claim 1, wherein the metadata index subtable is created based on the query's type.

12. The method of claim 1, wherein the metadata index subtable is created based on the query's predicate.

13. The method of claim 1, wherein the metadata index subtable is updated only when an inserted, deleted or updated column value in the column-partitioned base table is a minimum column value or a maximum column value for a container.

14. A computer-implemented apparatus, comprising:
a relational database management system (RDBMS) executing in a computer system, wherein:

the RDBMS manages a relational database comprised of at least one column-partitioned base table storing data;

column values from at least one column of the column-partitioned base table are stored in one or more partitions comprised of one or more containers spread across one or more data blocks;

metadata comprising summarized information about the column values in the containers is stored in a metadata index subtable, wherein the metadata index subtable is comprised of metadata information for accessing the partitions, containers and data blocks, which includes a partition identifier for the column-partitioned base table, a row identifier for the metadata index subtable that is also a container identifier for the column-partitioned base table, a minimum column value, and a maximum column value; and a query with a filtering condition on a column of the column-partitioned base table is applied to the metadata index subtable before the column-partitioned base table is accessed, so that only qualified containers and data blocks are accessed, and unqualified containers and data blocks are eliminated, when responding to the query.

15. A computer program product, the computer program product comprising a non-transitory computer readable storage medium having program instructions accessible therefrom, the program instructions executable by a computer system to cause the computer system to perform a method, comprising:

executing a relational database management system (RDBMS) in a computer system, wherein:

the RDBMS manages a relational database comprised of at least one column-partitioned base table storing data;

column values from at least one column of the column-partitioned base table are stored in one or more partitions comprised of one or more containers spread across one or more data blocks;

metadata comprising summarized information about the column values in the containers is stored in a metadata index subtable, wherein the metadata index subtable is comprised of metadata information for accessing the partitions, containers and data blocks, which includes a partition identifier for the column-partitioned base table, a row identifier for the metadata index subtable that is also a container identifier for the column-partitioned base table, a minimum column value, and a maximum column value; and a query with a filtering condition on a column of the column-partitioned base table is applied to the metadata index subtable before the column-partitioned base table is accessed, so that only qualified containers and data blocks are accessed, and unqualified containers and data blocks are eliminated, when responding to the query.

* * * * *